(12) United States Patent
Belady et al.

(10) Patent No.: US 8,104,041 B2
(45) Date of Patent: Jan. 24, 2012

(54) COMPUTER WORKLOAD REDISTRIBUTION BASED ON PREDICTION FROM ANALYSIS OF LOCAL RESOURCE UTILIZATION CHRONOLOGY DATA

(75) Inventors: Christian L. Belady, Richardson, TX (US); Thomas L Vaden, Bridgewater, NJ (US); Daniel Edward Herington, Richardson, TX (US); Thomas Edwin Turicchi, Jr., Richardson, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1496 days.

(21) Appl. No.: 11/409,853

(22) Filed: Apr. 24, 2006

(65) Prior Publication Data

US 2007/0250838 A1    Oct. 25, 2007

(51) Int. Cl.
*G06F 9/46* (2006.01)
*G06F 15/173* (2006.01)
*G06F 1/26* (2006.01)

(52) U.S. Cl. ......... 718/105; 718/104; 709/226; 713/320

(58) Field of Classification Search .................. None
See application file for complete search history.

(56) References Cited

U.S. PATENT DOCUMENTS

| | | | |
|---|---|---|---|
| 6,260,068 B1 * | 7/2001 | Zalewski et al. | 709/226 |
| 6,516,348 B1 * | 2/2003 | MacFarlane et al. | 709/224 |
| 6,691,067 B1 * | 2/2004 | Ding et al. | 702/186 |
| 6,738,736 B1 * | 5/2004 | Bond | 703/2 |
| 6,877,035 B2 * | 4/2005 | Shahabuddin et al. | 709/226 |
| 7,167,915 B2 * | 1/2007 | Bendich et al. | 709/224 |
| 7,454,502 B2 * | 11/2008 | Grimm et al. | 709/226 |
| 7,539,881 B2 * | 5/2009 | Shaw et al. | 713/300 |
| 7,552,208 B2 * | 6/2009 | Lubrecht et al. | 709/223 |
| 7,644,148 B2 * | 1/2010 | Ranganathan et al. | 709/223 |
| 7,665,090 B1 * | 2/2010 | Tormasov et al. | 718/104 |
| 7,698,111 B2 * | 4/2010 | Abrahao et al. | 703/2 |
| 2002/0062454 A1 * | 5/2002 | Fung | 713/300 |
| 2002/0143945 A1 * | 10/2002 | Shahabuddin et al. | 709/226 |
| 2002/0152305 A1 * | 10/2002 | Jackson et al. | 709/224 |
| 2003/0023719 A1 * | 1/2003 | Castelli et al. | 709/224 |
| 2004/0267932 A1 | 12/2004 | Voellm | |
| 2005/0060590 A1 * | 3/2005 | Bradley et al. | 713/320 |
| 2005/0210469 A1 | 9/2005 | Chung | |
| 2005/0210470 A1 | 9/2005 | Chung | |
| 2005/0251802 A1 * | 11/2005 | Bozek et al. | 718/1 |
| 2006/0080268 A1 | 4/2006 | Afeyan | |
| 2006/0248361 A1 * | 11/2006 | Fung | 713/300 |

OTHER PUBLICATIONS

Miksatko, J.: Dynamic: Load Balancing of Fine-Grain Services Using Prediction Based on Service Input; Master Thesis, Kansas State University, Manhattan, Kansas 2004, 80 pages.

* cited by examiner

*Primary Examiner* — Meng An
*Assistant Examiner* — Abdullah Al Kawsar

(57) ABSTRACT

The present invention provides for redistributing workloads among computers to optimize resource utilization. Utilization by software workloads of computer resources is monitored to yield utilization data. A utilization chronology is updated using the utilization data. The chronology is analyzed to yield resource utilization predictions. The workloads are redistributed among the resources at least in part as function of said predictions.

16 Claims, 2 Drawing Sheets

COMPUTER WORKLOAD REDISTRIBUTION BASED ON PREDICTION FROM ANALYSIS OF LOCAL RESOURCE UTILIZATION CHRONOLOGY DATA

BACKGROUND OF THE INVENTION

Herein, related art is discussed to aid in understanding the invention. Related art labeled "prior art" is admitted prior art; related art not labeled "prior art" is not admitted prior art.

One of the classic challenges for information technology (IT) managers is to insure that they have capacity for their peak computational loads. As a result, they may typically have low utilization of their computers (for example 25% of capacity) except for the rare occurrence of 100% peak. For example, an Internet service provider (ISP), such as AOL, may have peak usage of their web servers once a day during the late evening hours since most of their clients surf the web after dinner. The ISP has their servers on all the time consuming power even though utilization during most of the day may be less than 25% of the capacity; as a result, at least 75% of the power is wasted. In addition, servers are usually not turned off or put in sleep mode (as is done with laptops) when not in use so that servers can be activated instantaneously on demand.

To deal with this, IT managers have done the following: 1) they buy enough computers to deal with peak demands; the disadvantage of this is that full power is being used by computers even though they are just partially utilized; 2) they use "Instant Capacity" (ICAP, available from Hewlett-Packard Company) and comparable solutions that allow them to add processors based on demand; the disadvantage is that while the data center owner is not paying for the unused hardware, it is still paying for the power consumed by it; and 3) they buy computers to deal with the average loads; the disadvantage of this is that the IT manager's company then cannot support peak demand and thus loses revenue.

For economic and energy-conservation purposes, it would be beneficial to improve the match between workload and resources. This can mean getting more done with the resources available, more accurately matching resource requirements to energy consumption, or freeing unneeded resources for inactivation so that energy consumption can be reduced. One way to do this is to select optimal power versus performance modes based on feedback from utilization monitors. For example, if utilization of a processor is 50% when it is in high-performance mode, its clock speed can be lowered to achieve a higher utilization ratio and a more-than-proportional reduction in electrical energy usage. Concomitantly, power can be reallocated among components based on utilization. However, such methods are not optimal.

BRIEF DESCRIPTION OF THE DRAWINGS

The following drawings are of embodiments/implementations of the invention and not of the invention itself.

DETAILED DESCRIPTION

In the course of the present invention, it was realized that the foregoing methods based on current measurements of utilization, while beneficial, were limited in what they could accomplish. They are limited because they control parameters that can be changed relatively quickly in response to changes in power demands. It was further realized that, if future use could be predicted, applications could be assigned to servers in a way that would minimize the number of servers without impacting performance. This would reduce energy consumption and maintenance costs. Furthermore, there would be less need to overbuy to avoid performance bottlenecks.

Figure 1:
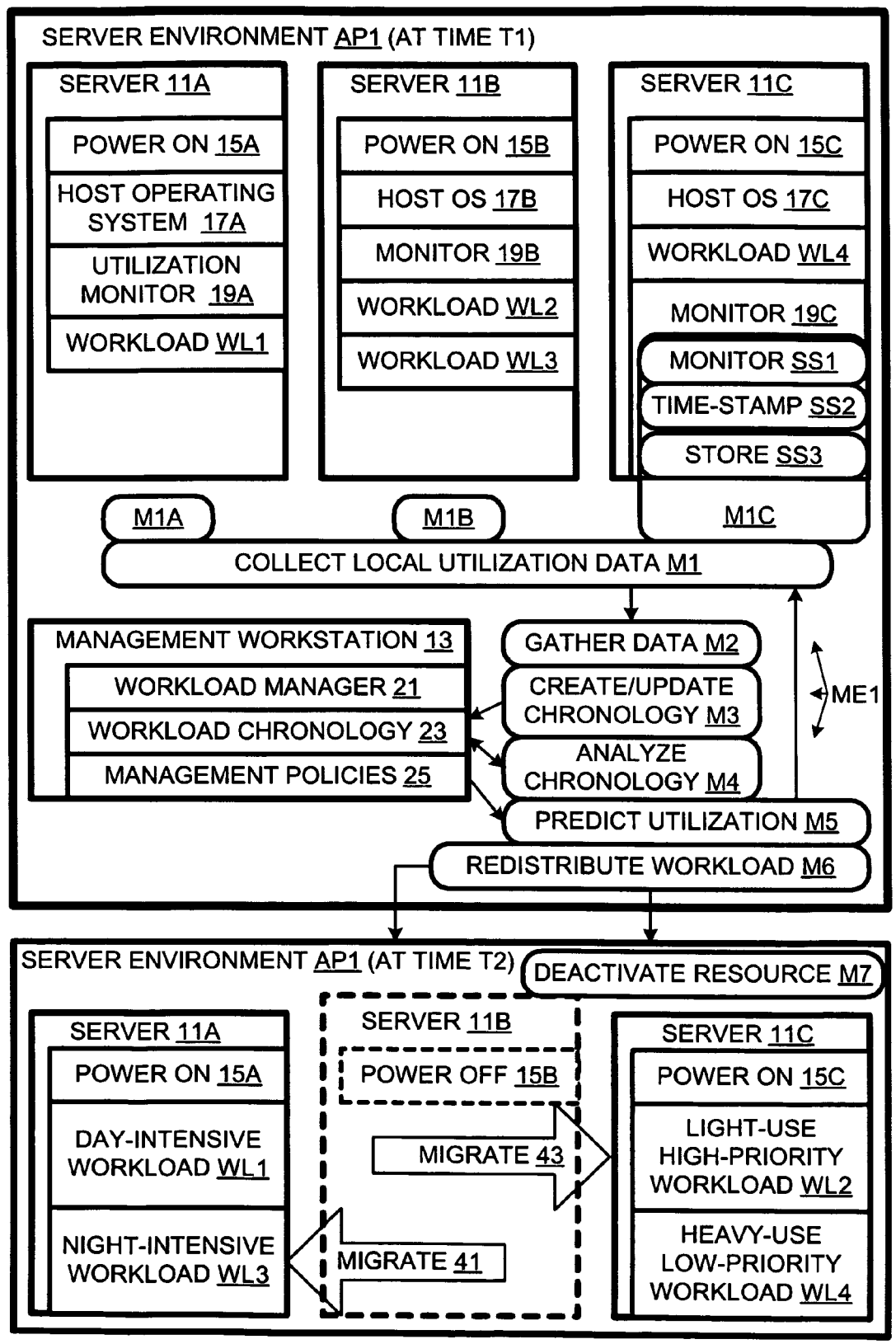
FIG. 1 is a hybrid block diagram of a computer system and a flow chart of a method practiced in the context of the system in accordance with an embodiment of the present invention.

A server environment AP1 in accordance with the present invention is shown in FIG. 1 at times T1 and T2. Server environment AP1 includes three servers 11A, 11B, and 11C, and a management workstation 13. Servers 11A, 11B, and 11C have reduced power modes. In the illustrated embodiment, servers 11A, 11B, and 11C, and management workstation 13 are unpartitioned stand-alone computers. However, in alternative embodiments, the servers can be blades in a rack, or hard partitions of host servers; also, the function of management workstation 13 may be assumed by one of the servers, partitions, or blades. More generally, the invention applies to server environments and computer networks with any number of computers of any configuration and with any combination of software installed.

Server 11A includes a power supply 15A and runs software including a host operating system 17A, and a utilization monitor 19A. In addition, there can be plural virtual partitions and machines. At time T1, server 11A runs a migrateable workload WL1, which can be an application program or a virtual machine running an application program. Server 11B includes a power supply 15B and runs a host operating system 17B, and a utilization monitor program 19B. At time T1, server 11B runs migrateable workloads WL2 and WL3. Server 11C includes a power supply 15C, and runs a host operating system 17C and a utilization monitor program 19C. At time T1, server 11C also runs a workload WL4.

Management workstation 13 runs a workload manager program 21 on computer readable media. Workload manager 21 predicts future application use based on real-time statistical evaluation of historic utilization data stored in workload chronology database 23. This analysis is used to dynamically match workloads to servers to implement management policies 25, e.g., minimizing the number of resources needed so that unused resources can be inactivated.

Servers 11A, 11B, and 11C, and management workstation 13 cooperate to implement a method ME1 in accordance with the invention. Method segment M1 involves collecting local utilization data. This collecting is performed concurrently at method segments M1A, M1B, and M1C, respectively, for servers 11A, 11B, and 11C by the respective utilization monitoring programs 19A, 19B, and 19C, each of which provides a measure of power consumption within particular computing resources. This power consumption can be a direct measurement of hardware power usage or it may be inferred from the activity level of elements within the computing resource. This monitoring can continue for days, weeks, months, and even years to capture usage patterns over like periods of time.

Monitoring programs 19A, 19B, and 19C are functionally similar, all performing method sub-segments SS1, SS2, and SS3 as described below with respect to server 11C. At method subsegment SS1, utilization monitor program 19C monitors resource utilization by server 11C in general and workload WL4 in particular, generating resource utilization data. This data is time-stamped at method subsegment SS2; the time-stamped utilization data is stored locally at method subsegment SS3.

At method segment M2, workload manager 21 gathers the stored time-stamped data generated at method segment M1. Workload manager 21 monitors and records power consumption on an aggregate level via system software. This data aggregation can be across computing systems in a data center or across blade servers in a rack-mounted system.

At method segment M3, workload manager 21 updates (or creates, if one is not already created) workload chronology 23 using the recently gathered utilization data. Over time, chronology 23 expands to include hourly, daily, weekly, monthly, and yearly utilization and configuration data. The configuration data includes: 1) server configuration data that can aid in determining the amount of resources available for workloads; and 2) workload configuration data from which can aid in determining the amount of resources a workload is likely to consume. For example, a chronology entry might indicate that a given application running on a given virtual machine with its respective specifications running on given hardware with its respective specifications is utilizing 30% of processor capacity, 20% of memory capacity, 10% of input/output device capacity, and 5% of disk storage capacity at a particular date and time.

At method segment M4, workload manager 21 analyzes chronology 23, regarding resource utilization by workloads WL1-WL4. For example, analysis of chronology 23 may indicate daily, weekly, monthly, and/or yearly patterns in the utilization associated with a workload. Some cases in point: 1) a web portal has peak usage in the evening because users tend to access the portal after dinner; 2) an accounting application might be active at the end of months and quarters; and 3) an on-line retail application might be impacted by surging sales during certain times of the year.

The analysis of method segment M4 can discover time-based patterns that can be extrapolated to predict future usage at method segment M5. The prediction can be of the form that the future will replicate the past, e.g., since a portal has been busy every weekday at 8 pm for the past two months, it will continue to be busy at 8 pm everyday in the future. However, predictions can also incorporate trending, e.g., the prediction can be to the following effect "the application continues to be busy at 8 pm and the magnitude of the busy peaks will grow 10% over the next six months". Furthermore, the chronology can be associated with external events (e.g., economic indicators, weather) so that the predictions can be event based and not merely time based. Note that this data can be used for determining a demand growth rate and thus assist information technology buying decisions.

At method segment M6, workloads WL1-WL4 are redistributed at least in part as a function of the predictions. The function is derived from management policies 25. For example, based on the analysis and management policies, workload management software migrates applications to the most effective computing system footprint that provides optimal power consumption in at least three variations: 1) explicit power level controls across a complex; 2) bin-packing applications into the smallest high-utilization footprint; and 3) a combination of 1 and 2. Also, the policy can stipulate how variations in available power are to be addressed, e.g., during a brownout.

Once the redistribution is implemented, any "freed" resource (e.g., processor, input/output device, memory, storage, partition, or whole server) from which all workloads have been removed, can be shut down or placed into a lower-power state at method segment M7. For example a system may enter a lower-power state such as a C1 processor state, a D1 device state, a G1 global state, etc, as defined by the ACPI specification. For example, a Montecito Itanium processor (available from Intel Corporation) can be set to a "halt-lite" state. In this HALT_LITE state, processing is halted but state data is preserved so that full operation can be resumed with minimum latency. Also, memory modules can be turned off or put in lower power modes. In addition, storage media can enter low power modes or hard disk spindles can be turned off. Also, parts of a network fabric can be powered down.

"Advanced Configuration and Power Interface Specification" (ACPI) promulgated by Hewlett-Packard Corporation, Intel Corporation, Microsoft Corporation, Phoenix Technologies Ltd., and Toshiba Corporation, Revision 3.0, Sep. 2, 2004, particularly pages 13-23. The ACPI specification defines global power states G0-G3, device states D0-D3, and processor states C0-C3. In addition, there are "sleeping" states with state G1 and performance level states P0, and P1-Pn within device state D0 and processor state C0. Not all systems, devices, and processors have all states. Systems, devices, and processors that do not conform nominally to the ACPI standard often have analogous states.

Depending on the how much risk is acceptable according to management policies 25, workstation manager 21 can use average, sigma, 2-sigma or 3-sigma statistical data. The analysis can be implemented with fine granularity (such as turning one server off at a time or in large blocks of servers depending on what makes more sense from a server management standpoint). Also, computers are powered on just prior to when the need for their services is expected to arise. What constitutes "just prior" depends on the precision of a prediction and confidence level of a prediction. A resource should be ready earlier when the confidence level and/or precision of a prediction is low.

In FIG. 1, the arrow from "predict utilization" method segment M5 to "collect data" method segment M1 indicates that method ME1 is iterated so that monitoring, chronology updates, analyses, and workload redistributions are ongoing. Continued power measurement and monitoring provides a feedback loop to workload manager 21 to fine tune—as needed—the workload/power analysis and continue to take appropriate policy-dictated action in the form of application migration. This allows inactivated resources to be brought online "just in time", and provides savings analogous to those achieved by "just-in-time" manufacturing.

The following description of purely hypothetical outcomes is presented for expository purposes. One example of a management policy would be to use as few servers as possible provided no server utilization exceeds 90% more than 10% of the time, and, if that part of the criterion is met, to distribute workloads to spread resource utilization evenly among the servers that are used. Such a policy might result in the workload distribution shown for server environment AP1 at time T2 in FIG. 1 and described below.

The chronology analysis performed at method segment M4 may have determined that workload WL1 can require 60% of the processor capabilities of a server during the day, but about 20% at night. On the other hand, the analysis might indicate that workload WL2 uses about 20% during the day and 60% at night. Accordingly, even though the sum of the peak utilizations for workloads WL1 and WL2 exceeds 100%, the peak of their combined loads would be 80%. Extrapolating these percentages into the future, yields an expected peak combined resource utilization of 80%. In accordance with this prediction, they have been combined at T2 on one server. This is a special case of having workloads having periodic peaks of the same periodicity and complementary phases sharing resources.

Similarly, the analysis might predict that high-priority workload WL2 is used intermittently. In that case, workload WL2 might be assigned a high priority, for example, because it involves real-time video transfer. Since its requirements are intermittent it can be complemented by workload WL4, assuming the analysis indicates it is heavily used but is assigned a low priority, e.g., because its results can be other than real time.

Pursuant to the hypothetical analysis, workload WL3 is reallocated (migrated) from server 11B to server 11A as indicated by migration arrow 41, while workload WL2 is reallocated from server 11B to server 11C, as indicated by migration arrow 43. Since server 11B has no workloads after redistribution, it can be shutdown or put in a sleep or other low-power mode, thus saving energy and reducing operating costs. The predictions can also be used to combine workloads with other types of complementary relationships, e.g., a workload having a growing demand can be paired with workload for which demand is projected to decrease.

Since the predictions allow for more effective workload distributions, they can be used to extend the usefulness of a current level of hardware. In other words, expansion of existing hardware can be delayed. In the case where space, cooling capacity, and power infrastructure are stressed, this delay can mean the lifetime of an existing plant can be extended and investments in new facilities can be forestalled.

Generally, management policies, including management policies 25, can be used to define a (possibly very complex) criterion for evaluating potential redistributions. Management policies 25 take power conservation into consideration for the reasons indicated in the background section above; however, other management policies include very different factors and not all specify power conservation as a factor. For example, policies can be designed to optimize individually or in combination factors such as hardware cost, highest utilization, and lowest cost of ownership (including energy use and depreciation). Further examples are considered below.

Some interesting management policy factors apply to server environments that are geographically distributed over two or more continents. The policies may include restrictions based on export laws and software licenses; for example, it may not be possible to migrate certain encryption programs to an overseas site. The policies might require that mirror instances of a workload not be located at the same site where they both might fail in the event of a local power outage. The management policies might favor servers that are completely owned by a customer over those in which the vendor retains usage rights, e.g., reserve processors.

Management policies can also take into account the relative ease or difficulty of migrating workloads. More headroom can be reserved when migration is time consuming and/or expensive. On the other hand, less headroom can be reserved where migration is fast and inexpensive.

From the power perspective: 1) System software provides a measure of power consumption within a particular computing resource; this power consumption may be a direct measurement of hardware power usage or it may be inferred from the activity level of elements within the computing resource. 2) Workload management software monitors and records power consumption on an aggregate level via system software; this data aggregation can be across computing systems in a data center or across blade servers in a rack-mounted system. 3) The analysis takes current power consumption and historical data and, for a given policy, determines the best placement of workload on given computing systems to optimize power consumption in the context of workload priorities. 4) Based on the analysis and management policies workload management software migrates applications to the most effective computing system footprint that provides optimal power consumption. 5) Continued power measurement and monitoring provides a feedback loop to workload management software to fine tune, as needed, the workload/power analysis and continue to take appropriate policy-dictated action in the form of application migration.

From the utilization/footprint perspective: 1) System software provides a measure of utilization within a particular computing resource. 2) Workload management software monitors and records data on utilization via system software. The aggregation of this data can be, for a pair of examples, across computing systems in a data center or across blade servers in a rack-mounted system. 3) The analysis can take current utilization and historical data and, for a given policy, determine the best placement of a workload on given computing systems to optimize utilization/footprint in the context of workload priorities. 4) Based on the analysis and management policies workload management software migrates applications to the most effective computing that provides optimal utilization/footprint within the server and/or across the data center. 5) Continued utilization measurement and monitoring provides a feedback loop to workload management software to fine tune—as needed—the workload/utilization/footprint analysis and continue to take appropriate policy-dictated action in the form of application migration.

The invention provides for dynamic workload management via migration of applications into the optimal power footprint based on power consumption data analysis. The strong customer need for (both large and small scale) dynamic power management has been shown anecdotally. Explicitly stated, the benefits could be: 1) Lower cost to users since consolidation is maximized and, thus, the amount of hardware is minimized. 2) The power allotted to applications is minimized without impairing application performance; this lowers overall operating costs.

An iteration of method ME1 can be initiated periodically by workload manager 21 or it can be asynchronously triggered in response to an "alarm" from a workload monitor, e.g., monitor 19A, when it detects that locally available resources are being stressed or some utilization threshold has been met.

Figure 2:
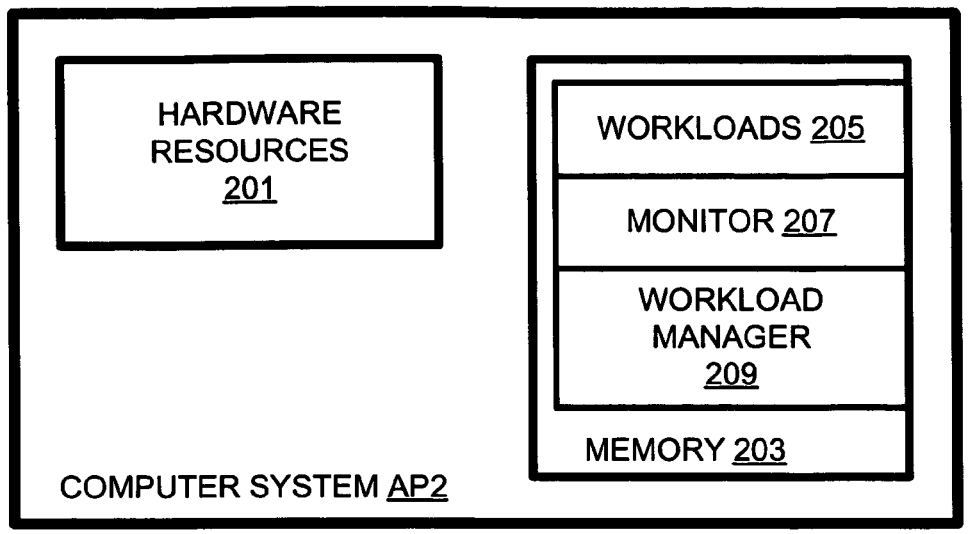
FIG. 2 is a block diagram of another computer system in accordance with an embodiment of the invention.

A second computer system AP2 in accordance with an embodiment of the invention is shown in FIG. 2. System AP2 comprises hardware resources 201, and memory 203. Memory 203 stores workloads 205, a resource utilization monitor 207, and a workload manager 209. Workload manager 209 implements method ME2 in accordance with an embodiment of the invention.

Figure 3:
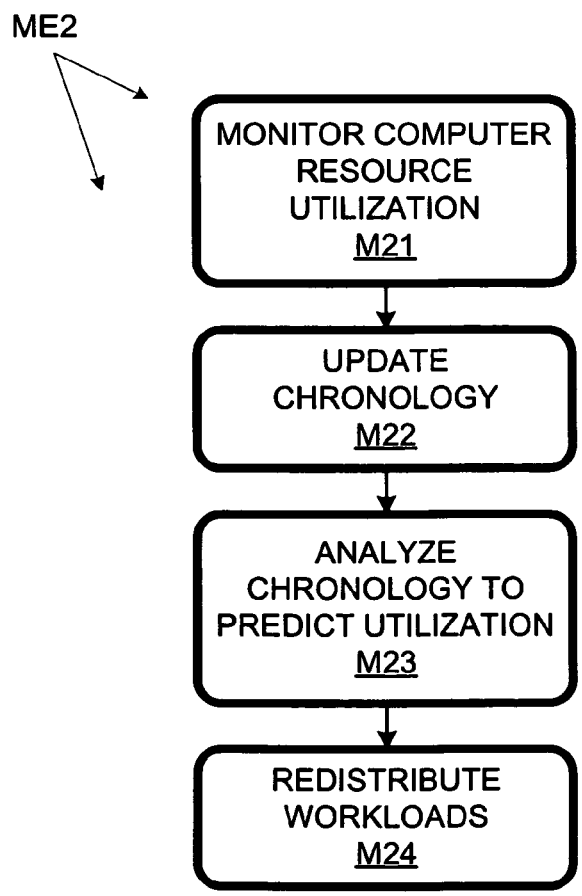
FIG. 3 is a flow chart of another method in accordance with an embodiment of the invention.

Method ME2 is flow charted in FIG. 3. It includes method segments M21-M24. In method segment M21, computer resource utilization is monitored. In method segment M22, a chronology is updated. In method segment M23, the chronology is analyzed to predict utilization. In method segment M24, workloads are redistributed as a function of utilization predictions.

In the illustrated embodiments, the workload manager "owns" the data collection and capacity projection functionality, as well as the workload migration. In alternative embodiments, these functions can be handled by separate modules. For example, a workload manager can manage data collection, a capacity advisor can make capacity projections and recommendations based on them, a migration utility can manage the actual redistributions. When the workload manager determines that resources have run out on a system, it can send an alarm to a distinct "orchestration engine" that a move should be initiated. The orchestration engine gets this alarm and then asks the capacity advisor for a recommendation for which workload to move and where. It then commands the migration product to move the workload. All this can happen in real time or can occur periodically, e.g., daily, weekly or monthly.

The capacity advisor can run the "plan" nightly or other off-peak time because it doesn't need to be using up to the minute data. Thus a plan can be in place before an alarm is received so that the redistribution can be implemented more quickly. The orchestrator can also be configured to initiate redistribution proactively without involving the workload manager. In this case, the orchestrator can get the plan from the capacity advisor each morning and decide if and when something needs to move. The orchestrator then schedules this move based on downtime windows, etc. for each of the workloads.

In general, a hardware, computer, or system resource is any part of a system that is capable of performing a task. Examples of resources typically found in computer systems include processors, input/output (I/O) devices, data storage devices, communication ports, displays, peripheral devices (e.g., printers, scanners, etc.), and so on. Of course, a "system" may be considered at any level of granularity. For instance, a plurality of computers communicatively coupled together via a communication network (e.g., a local area network (LAN), the Internet, or other wide area network (WAN), etc.) may collectively be considered a system, wherein each computer may be considered a system resource.

As another example, a large data center may be considered a system, and a plurality of computers (and other power-consuming resources) in the data center may each be considered a system resource. As another example, a printed circuit board within a personal computer (PC) may be considered a system, wherein each device (e.g., chip, etc.) implemented on the printed circuit board may be considered a system resource. The term "system" encompasses various types of computing systems, such as data centers, servers, personal computers (PCs), digital cameras, personal digital assistants (PDAs), laptops, workstations, mobile telephones, etc. Further, the term "system," unless otherwise qualified, is not limited to traditional computer systems, but may include any type of system having power-consuming resources, such as automobiles, airplanes, factories, etc.

In the illustrated embodiment, time-stamping and storage are performed on each server. In other embodiments, these method sub-segments can be omitted or performed after management workstation gathers the data from the servers. These and other variations upon and modification to the illustrated embodiment are provided for by the present invention, the scope of which is defined by the following claims.

What is claimed is:

1. A computer-implemented method comprising:
   a computer system monitoring utilization of computer resources by software workloads to yield local utilization data;
   said computer system updating a utilization chronology using said local utilization data;
   said computer system analyzing said chronology to yield resource utilization predictions; and
   said computer system redistributing said workloads among said resources at least in part as a function of said predictions, said redistributing involving migrating at least a first workload to a resource that is also serving a second workload wherein said first and second workloads have periodic peaks of the same periodicity and different phases.

2. A method as recited in claim 1 wherein said local utilization data is time-stamped, said chronology associating hourly, daily, weekly, monthly, and yearly utilization data with server and workload configuration data.

3. A method as recited in claim 1 further comprising powering down or causing to enter a low-power state a computing resource from which a workload has been removed by said redistributing.

4. A method as recited in claim 3 wherein the monitoring, updating, analyzing, and redistributing are iterated so that further redistributing involves causing said computer resource to enter a high-power state and migrating a workload to said computer resource.

5. A method as recited in claim 1 further comprising issuing an alarm as a function of said local utilization data, said redistributing being performed in response to said alarm.

6. A method as recited in claim 1 wherein an orchestrator program in non-transitory computer readable media, when executed, coordinates the monitoring, analyzing, and redistributing.

7. A system comprising:
   hardware resources; and
   non-transitory computer readable media including
   workloads distributed for utilizing respective combinations of said hardware resources;
   a monitoring program for monitoring utilization of said computer resources by said workloads to yield local utilization data; and
   a workload manager for updating a utilization chronology using said local utilization data, for analyzing said chronology to yield resource utilization predictions, and for redistributing said workloads among said resources at least in part as a function of said predictions, said redistributing involving migrating at least a first workload to a resource that is also serving a second workload wherein said first and second workloads have periodic leaks of the same periodicity and different phases.

8. A system as recited in claim 7 wherein said local utilization data is time-stamped, said chronology associating hourly, daily, weekly, monthly, and yearly utilization data with server and workload configuration data.

9. A system as recited in claim 7 wherein said workload manager is configured to power down or cause to enter a low-power state a computing resource from which a workload has been removed by said redistributing.

10. A system as recited in claim 9 wherein said workload manager includes means for causing said computing resource to enter a high-performance state and migrating a workload to said computing resource.

11. A system as recited in claim 7 wherein said workload manager provides for issuing an alarm when said local utilization data indicates a criterion has been met, said workload manager providing for redistribution of said workloads in response to said alarm.

12. A computer product comprising non-transitory computer-readable storage media encoded with code defining:
   a resource-utilization chronology; and
   a workload manager program configured to, when executed by a processor,
   monitor utilization of computer resources by software workloads to yield local utilization data;
   update said chronology using said local utilization data;
   analyze said chronology to yield resource utilization predictions; and
   redistribute said workloads among said resources at least in part as a function of said predictions, the redistributing involving migrating at least a first workload to a resource that is also serving a second workload wherein said first and second workloads have periodic peaks of the same periodicity and different phases.

13. A computer product as recited in claim 12 wherein said local utilization data is time-stamped, said chronology associating hourly, daily, weekly, monthly, and yearly utilization data with server and workload configuration data.

14. A computer product as recited in claim 12 wherein said workload manager program is further configured to power down or cause to enter a low-power state a computing resource from which a workload has been removed by the redistributing.

15. A computer product as recited in claim 14 wherein said workload manager program is further configured so that the monitoring, updating, analyzing, and redistributing are iterated so that further redistributing involves causing said computer resource to enter a high-performance state.

16. A computer product as recited in claim 12 wherein said workload manager program is configured to perform said redistribution in response to a received alarm.

* * * * *

UNITED STATES PATENT AND TRADEMARK OFFICE
CERTIFICATE OF CORRECTION

| | | |
|---|---|---|
| PATENT NO. | : 8,104,041 B2 | |
| APPLICATION NO. | : 11/409853 | |
| DATED | : January 24, 2012 | |
| INVENTOR(S) | : Christian L. Belady et al. | |

It is certified that error appears in the above-identified patent and that said Letters Patent is hereby corrected as shown below:

In column 8, line 36, in Claim 7, delete "leaks" and insert -- peaks --, therefor.

Signed and Sealed this
Nineteenth Day of February, 2013

Teresa Stanek Rea
*Acting Director of the United States Patent and Trademark Office*